United States Patent
Kondo

(10) Patent No.: US 6,909,405 B2
(45) Date of Patent: Jun. 21, 2005

(54) RADAR HEAD MODULE

(75) Inventor: Nobuhiro Kondo, Takatsuki (JP)

(73) Assignee: Murata Manufacturing Co., Ltd., Kyoto (JP)

(*) Notice: Subject to any disclaimer, the term of this patent is extended or adjusted under 35 U.S.C. 154(b) by 0 days.

(21) Appl. No.: 10/351,178

(22) Filed: Jan. 24, 2003

(65) Prior Publication Data

US 2003/0169199 A1 Sep. 11, 2003

(30) Foreign Application Priority Data

Jan. 24, 2002 (JP) ........................................ 2002-015948

(51) Int. Cl.$^7$ .......................... H01Q 1/42; G01S 13/00
(52) U.S. Cl. ...................................... 343/872; 342/70
(58) Field of Search ....................... 343/700 MS, 702, 343/865, 872, 753, 754, 755, 904, 912; 342/70, 175

(56) References Cited

U.S. PATENT DOCUMENTS

| | | | | |
|---|---|---|---|---|
| 6,075,492 A | * | 6/2000 | Schmidt et al. | 343/753 |
| 6,246,381 B1 | * | 6/2001 | VandenDolder et al. | 343/912 |
| 6,268,833 B1 | * | 7/2001 | Tanizaki et al. | 343/766 |
| 6,366,245 B1 | * | 4/2002 | Schmidt et al. | 343/700 MS |
| 6,556,174 B1 | * | 4/2003 | Hamman et al. | 343/755 |
| 6,563,477 B2 | * | 5/2003 | Ishikawa et al. | 343/911 R |
| 6,614,404 B1 | * | 9/2003 | Schmidt et al. | 343/753 |
| 6,665,592 B2 | * | 12/2003 | Kodama | 701/1 |
| 6,707,419 B2 | * | 3/2004 | Woodington et al. | 342/200 |

FOREIGN PATENT DOCUMENTS

JP 2000-508874 7/2000

* cited by examiner

Primary Examiner—Wilson Lee
Assistant Examiner—Minh Dieu A
(74) Attorney, Agent, or Firm—Keating & Bennett, LLP

(57) ABSTRACT

A radar head module includes a high-frequency circuit that sends and receives a radar beam for a radar, a case that covers the high-frequency circuit, and a mounting member for attaching the radar head module to an outside body on which the radar head is to be mounted. High-frequency circuits are attached to the mounting member. While a circuit board is attached on sides of the high-frequency circuits and another circuit board is attached on the bottom of the high-frequency circuits, the case is attached to the mounting member. The characteristic adjustment of the radar is performed by attaching a supporting portion of the mounting member to the frame before the case is covered thereon, and then the case is attached to the mounting member.

19 Claims, 3 Drawing Sheets

RADAR HEAD MODULE

BACKGROUND OF THE INVENTION

1. Field of the Invention

The present invention relates to a radar head module such as a vehicle-mounted EHF (extremely high frequency) radar and a characteristic adjustment method thereof.

2. Description of the Related Art

Japanese PCT Patent Publication No. 2000-508874 discloses microwave and millimeter-wave radars suitable for being vehicle-mounted. In a radar head module shown in this Publication, in order to effectively utilize a space between a primary radiator and a dielectric lens, a circuit board is arranged between the primary radiator and the dielectric lens and a notch for passing electromagnetic waves is formed on the circuit board.

However, in the radar head module shown in the Publication, a rectangular circuit board used generally is difficult to be utilized, thereby increasing cost. Since the circuit board is arranged on the back bottom of a box-like case, efficiency of assembling is low and manufacturing cost is increased. Furthermore, since the circuit board is attached to the case, the module cannot be operated as a radar head in a state in which the case is removed, so that characteristics of the radar head module cannot be absolutely adjusted in a state in which the case of the radar head module is attached at a predetermined position of a vehicle with the case removed.

SUMMARY OF THE INVENTION

In order to overcome the problems described above, preferred embodiments of the present invention provide a radar head module which is miniaturized and reduced in cost, and a characteristic adjusting method thereof.

A radar head module according to a preferred embodiment of the present invention includes a high-frequency circuit that sends and receives a radar beam for a radar, a case that covers the high-frequency circuit, and a mounting member for attaching the radar head module to an outside body, wherein the high-frequency circuit and the case are attached to the mounting member.

Preferably, the high-frequency circuit includes a primary radiator for sending and receiving the radar beam, and the mounting member includes a dielectric lens attached thereto and having a focal plane formed substantially at the position of the primary radiator.

Preferably, the high-frequency circuit includes a plurality of circuit boards constituting peripheral circuits of the high-frequency circuit, the plurality of circuit boards being arranged along the bottom and sides of the high-frequency circuit.

Preferably, circuit boards arranged on sides of the high-frequency circuit of the plurality of circuit boards are positioned at the back of the dielectric lens.

Preferably, the plurality of circuit boards are connected to each other with flexible substrates.

Preferably, a portion of the case is provided with a section that is thermally connected to a heat generating section of the high-frequency circuit.

Preferably, according to a preferred embodiment of the present invention, the case has a box-like shape with one open surface, and wherein the high-frequency circuit is shielded by the case, the mounting member, and the dielectric lens in a state in which the open surface is attached to the mounting member.

According to yet another preferred embodiment of the present invention, a method for adjusting characteristics of a radar head module having any one of the structures described above includes the steps of attaching the mounting member to the body to be mounted in a state in which members of the radar head module other than the case are attached to the mounting member, and performing characteristic adjustment.

According to another preferred embodiment of the present invention, the high-frequency circuit and the case are attached to the mounting member for attaching the radar head module to an outside body, so that a normal rectangular circuit board can be used. Also, an operation to attach the high-frequency circuit to the depth of the case is eliminated, thus facilitating and simplifying the assembly process. Furthermore, even when the case is not attached to the mounting member, the radar head module functions, extremely facilitating characteristic adjustment.

Also, the dielectric lens may be also attached to the mounting member, so that the positional relationship between the primary radiator of the high-frequency circuit and the dielectric lens can be accurately set, thus minimizing the effect due to assembly accuracies.

According to a preferred embodiment of the present invention, the plurality of circuit boards constituting peripheral circuits of the high-frequency circuit may be arranged along the bottom and sides of the high-frequency circuit, so that the circuit boards constituting peripheral circuits, which are not required to have the high relative positional-accuracies, can be positioned at a dead space, miniaturizing the entire projector.

In the plurality of circuit boards, the circuit boards arranged on sides of the high-frequency circuit may be positioned at the back of the dielectric lens, so that a space between the dielectric lens and the high-frequency circuit can be efficiently utilized, miniaturizing the entire projector that much.

The circuit boards may be connected to each other with flexible substrates, so that the plurality of circuit boards can be positioned within a small space within the case at a high degree of freedom.

A portion of the case may be provided with a section thermally connecting to a heat generating section of the high-frequency circuit, so that the heat produced in the high-frequency circuit is radiated while the entire projector is miniaturized, thus obtaining stable characteristics under wide-range temperature circumstances.

The high-frequency circuit may be shielded with the case, the mounting member, and the dielectric lens, so that dust-proof and water-proof characteristics thereof can be readily increased, increasing environment resistance.

Also, by attaching the mounting member to the body to be mounted before the case is attached thereto, and then by performing characteristic adjustment, predetermined characteristics under circumstances, in which the module is practically used, can be readily performed.

Other features, elements, steps, characteristics and advantages of the present invention will become more apparent from the following detailed description of preferred embodiments thereof with reference to the attached drawings.

DETAILED DESCRIPTION OF PREFERRED EMBODIMENTS

A structure of a radar head module according to a preferred embodiment of the present invention will be described with reference to FIGS. 1 to 3.

Figure 1:
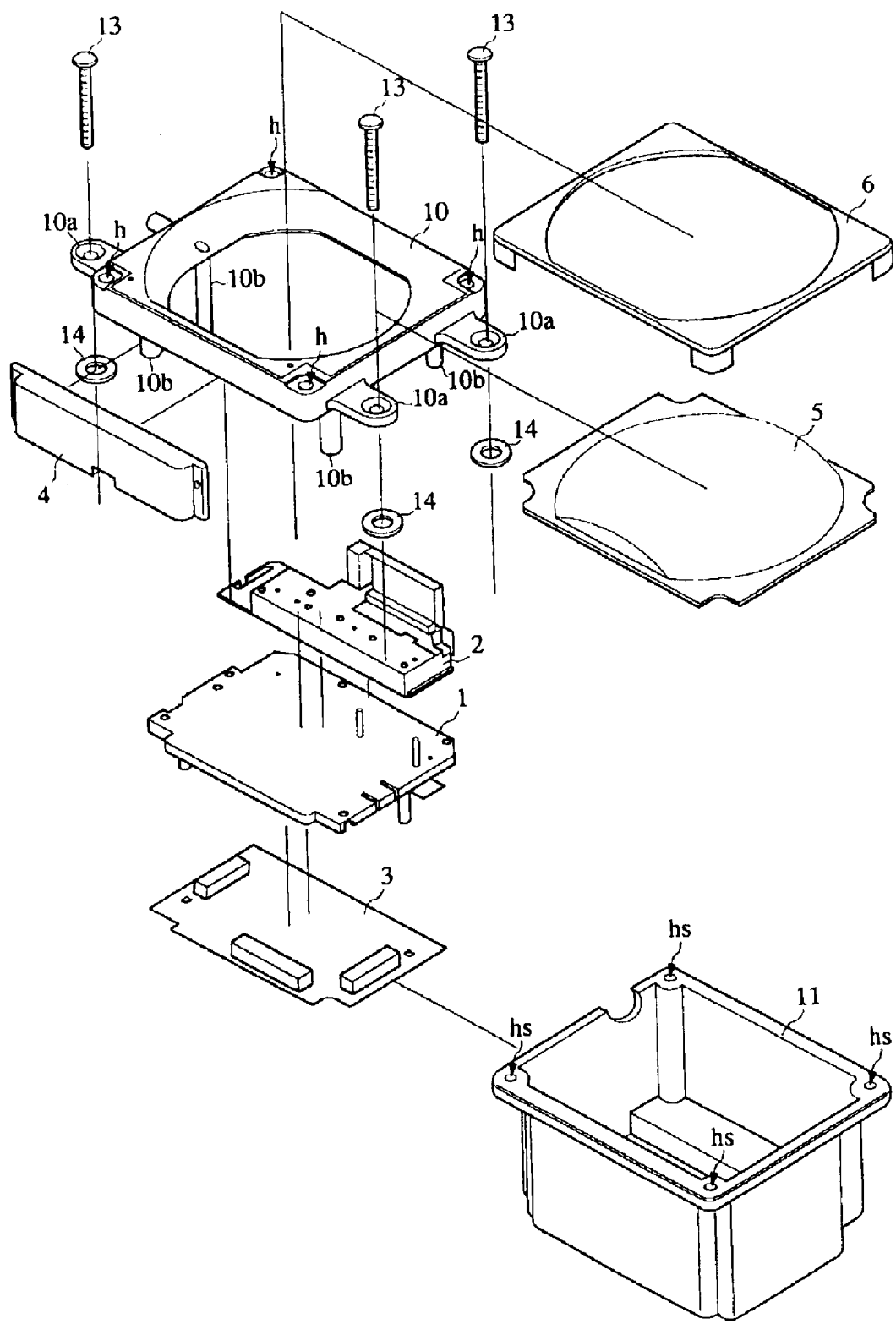
FIG. 1 is an exploded view of a radar head module according to a preferred embodiment of the present invention.

FIG. 1 is an exploded view of the radar head module; FIG. 2 is a sectional view of the radar head module in an assembled state and attached to a body to be mounted.

Referring to FIG. 1, a mounting member 10 is a member to be mounted by various members, which will be described later, for attaching them to the body to be mounted, such as a vehicle. Numerals 1 and 2 denote a high-frequency wave circuit (a high-frequency wave block). A circuit board 3 arranged on the bottom of the high-frequency wave circuit 1 and circuit boards 4 arranged on sides of the high-frequency wave circuits 1 and 2 constitute peripheral circuits of the high-frequency wave circuit. In FIG. 1, only one circuit board 4 on the side is shown and the other opposing it is omitted for brevity. A dielectric lens 5 is attached on the front surface of the mounting member 10. A lens cover 6 is for provided fixing the dielectric lens 5 to the mounting member 10.

A case 11 has a box-like shape with one open surface to be attached to the mounting member 10. The case 11 is attached to the mounting member 10 in a state in which the high-frequency wave circuits 1 and 2 and the circuit boards 3 and 4 are attached to the mounting member 10, so as to surround these circuits and circuit boards. The case 11, the dielectric lens 5, and the lens cover 6 seal the internal high-frequency wave circuits 1 and 2 and the circuit boards 3 and 4.

Figure 2:
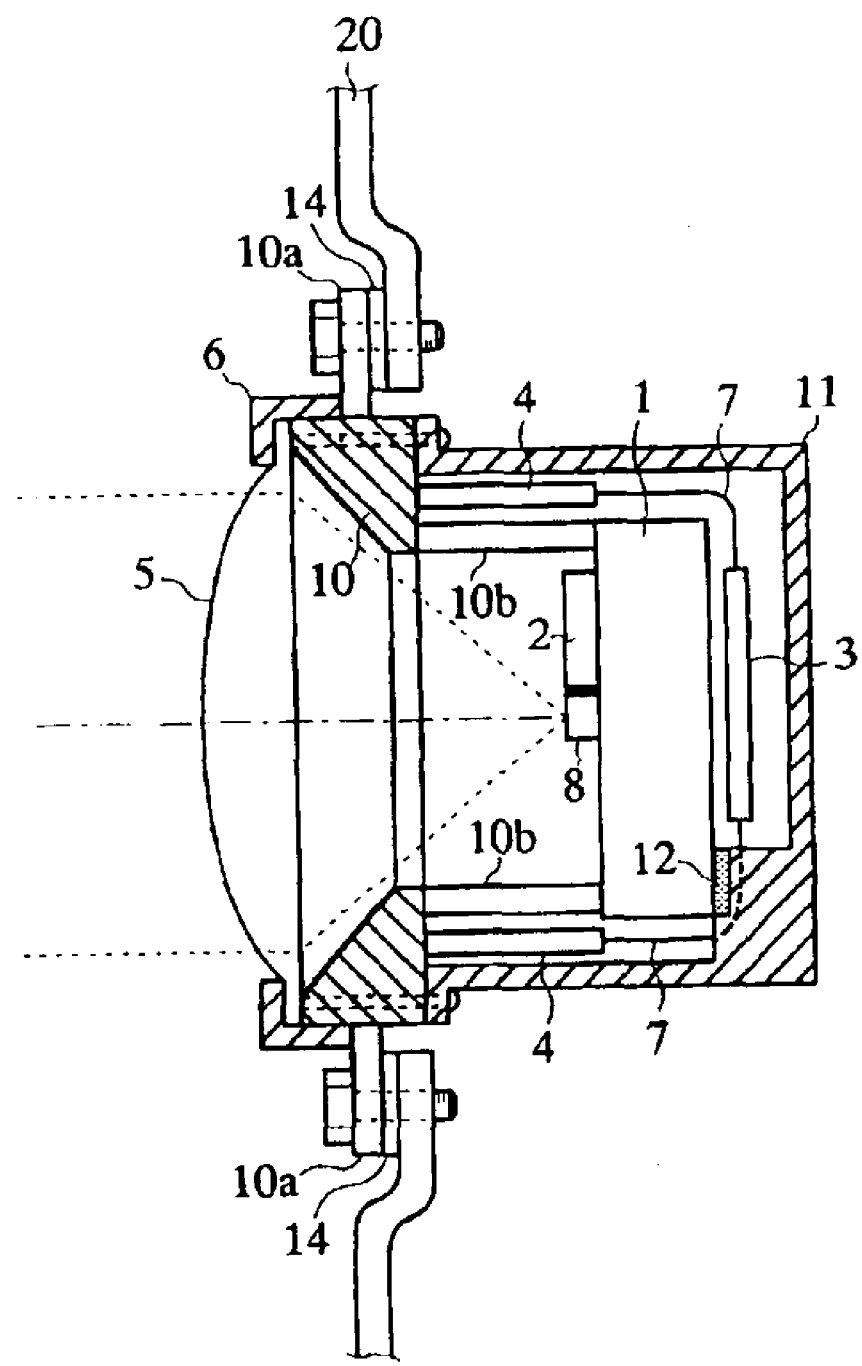
FIG. 2 is a sectional view of the radar head module in a state attached to an outside body.

Referring to FIG. 2, numeral 20 denotes a frame of the body on which the radar is to be mounted, such as a vehicle and numeral 10a denotes a supporting portion for supporting the mounting member 10 to the frame 20 with a bolt.

Numeral 10b denotes projections of the mounting member 10. The high-frequency wave circuit 1 is fixed to the projections 10b with screws in a state abutted to the projections 10b. The high-frequency wave circuit 1 is provided with a primary radiator 8. The size of the projections 10b is determined so that the primary radiator 8 is positioned on a focal plane of the dielectric lens 5.

The circuit boards 4 disposed on sides of the high-frequency wave circuits 1 and 2 are arranged on the back of the dielectric lens 5. That is, the circuit boards 4 are arranged inside the aperture diameter of the dielectric lens 5. These circuit boards 4 and the other circuit board 3 are connected to each other with flexible substrates 7 therebetween.

The high-frequency wave circuit 1 preferably includes a power amplifier and an oscillator, and in order to transmit the heat produced by these units to the case 11, an elastic heat-transmission member 12 is interleaved between the high-frequency wave circuit 1 and the case 11. The case 11 is preferably formed by die casting of aluminum, and is excellent in heat dissipation because the thermal conductivity and the radiation area are large.

As shown in FIG. 1, on the open surface of the case 11, a flange is formed, which has screw insertion holes hs formed at four corners of the flange. As shown in FIG. 2, the case 11 is fixed to the mounting member 10 by screwing into thread holes h of the mounting member 10 from the side of the case 11 in a state that the open surface of the case 11 is abutted to the mounting member 10.

On the front surface of the mounting member 10, the dielectric lens 5 is arranged so as to cover the open surface of the mounting member 10, and by fitting the lens cover 6 to the mounting member 10, the mounting member 10, the dielectric lens 5, and the lens cover 6 are integrated.

In order to attach the radar head module described above to the frame 20, screw holes formed in the supporting portions 10a of the mounting member 10 and screw holes formed in the frame 20 are fixed to each other by screwing with bolts with washers 14 therebetween.

In order to adjust characteristics of the radar head module described above, the radar head module is fixed to a predetermined jig without having the case 11 attached thereto, and by measuring the characteristics, the high-frequency wave circuits 1 and 2 or the circuit boards 3 and 4 are adjusted so as to obtain predetermined characteristics. Then, the case 11 may be attached thereto.

If this radar head module is adjusted in characteristics in a state attached to a body upon which the radar is to be mounted, such as a vehicle, in which the module is finally used, without the cover 11 attached thereto, and then the cover 11 is attached thereto, the adjustment for obtaining predetermined characteristics under circumstances, in which the module is practically used, can be readily performed.

Figure 3:
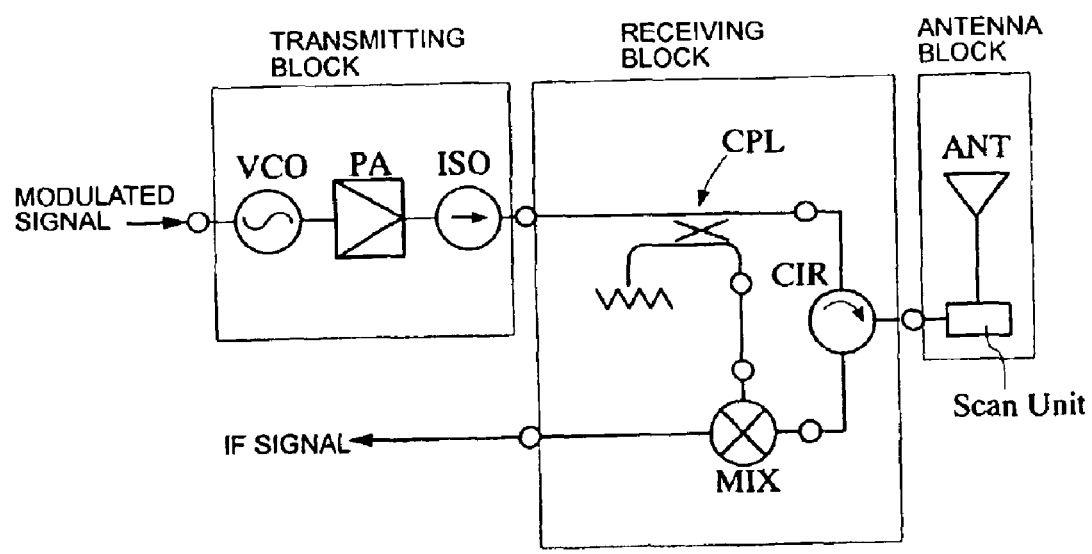
FIG. 3 is a block diagram of the radar head module.

FIG. 3 is a block diagram of a structure of the radar head module described above. Wherein symbol VCO denotes a voltage-controlled oscillator using a Gunn diode and a varactor diode, symbol PA denotes a power amplifier for power-amplifying an originating signal. An isolator ISO prevents a reflected signal from returning to the power amplifier PA. A coupler CPL is a directional coupler including an NRD guide for deriving a portion of a transmitting signal as a local signal. A circulator CIR gives a transmitting signal to a scan unit while transmitting a receiving signal toward a mixer MIX. The mixer MIX mixes the receiving signal with the local signal mentioned above so as to output an intermediate-frequency signal IF.

From the modulated signal and IF signal mentioned above, the relative distance and relative speed of a target are detected by an FM-CW system.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A radar head module comprising:
   a high-frequency circuit that sends and receives a radar beam for a radar;
   a case that covers the high-frequency circuit; and
   a mounting member for attaching the radar head module to an outside body on which the radar head is to be mounted;
   wherein the high-frequency circuit and the case are attached, directly or indirectly, to the mounting member so that the case can be removed from the mounting member independently of the high-frequency circuit.

2. A radar head module according to claim 1, wherein the high-frequency circuit includes a primary radiator for sending and receiving the radar beam.

3. A radar head module according to claim 2, wherein the mounting member includes a dielectric lens attached thereto and having a focal plane formed substantially at the position of the primary radiator.

4. A radar head module according to claim 3, wherein the mounting member includes projections and the high-frequency circuit is fixed to the projections, the high-frequency circuit includes a primary radiator and the projections are arranged such that the primary radiator is positioned on a focal plane of the dielectric lens.

5. A radar head module according to claim 3, wherein the circuit boards are arranged inside an aperture diameter of the dielectric lens.

6. A radar head module according to claim 3, further comprising a lens cover fitted to the mounting member such that the mounting member, the dielectric lens, and the lens cover are integrated together.

7. A radar head module according to claim 1, wherein the high-frequency circuit includes a plurality of circuit boards constituting peripheral circuits of the high-frequency circuit, the plurality of circuit boards being arranged along the bottom and sides of the high-frequency circuit.

8. A radar head module according to claim 7, wherein circuit boards arranged on sides of the high-frequency circuit of the plurality of circuit boards are positioned at the back of the dielectric lens.

9. A radar head module according to claim 7, wherein the plurality of circuit boards are connected to each other with flexible substrates therebetween.

10. A radar head module according to claim 1, wherein a portion of the case is provided with a section thermally connected to a heat generating section of the high-frequency circuit.

11. A radar head module according to claim 1, wherein the case has a box shape with one open surface, and the high-frequency circuit is shielded by the case, the mounting member, and the dielectric lens in a state in which the open surface is attached to the mounting member.

12. A radar head module according to claim 1, wherein the mounting member includes projections and the high-frequency circuit is fixed to the projections.

13. A radar head module according to claim 1, wherein the high-frequency circuit includes a power amplifier and an oscillator.

14. A radar head module according to claim 13, wherein an elastic heat-transmission member is disposed between the high-frequency circuit and the case.

15. A radar head module according to claim 1, wherein the case has a flange and the case is fixed to the mounting member via the flange.

16. A method for adjusting characteristics of a radar head module including a high-frequency circuit that sends and receives a radar beam for a radar, a case that covers the high-frequency circuit, and a mounting member for attaching the radar head module to an outside body on which the radar head is to be mounted, wherein the high-frequency circuit and the case are attached to the mounting member, the method comprising the steps of:
attaching the radar head module to the outside body via the mounting member without the case being attached to the radar head module; and
performing characteristic adjustment of the radar head module.

17. A method according to claim 16, wherein the step of attaching includes the step of fixing the radar head module to a jig without having the case attached thereto and measuring characteristics of the radar head module.

18. A method according to claim 17, wherein the step of performing characteristic adjustment includes the step of adjusting the high-frequency circuit based on the measured characteristics.

19. A method according to claim 18, further comprising the step of fixing the case to the radar head module after performing characteristic adjustment.

* * * * *